(12) United States Patent
Park et al.

(10) Patent No.: US 12,266,343 B2
(45) Date of Patent: Apr. 1, 2025

(54) ELECTRONIC DEVICE AND CONTROL METHOD THEREOF

(71) Applicant: SAMSUNG ELECTRONICS CO., LTD., Suwon-si (KR)

(72) Inventors: Sangjun Park, Suwon-si (KR); Kihyun Choo, Suwon-si (KR)

(73) Assignee: SAMSUNG ELECTRONICS CO., LTD., Suwon-si (KR)

(*) Notice: Subject to any disclaimer, the term of this patent is extended or adjusted under 35 U.S.C. 154(b) by 232 days.

(21) Appl. No.: 17/534,969

(22) Filed: Nov. 24, 2021

(65) Prior Publication Data
US 2022/0270588 A1 Aug. 25, 2022

Related U.S. Application Data

(63) Continuation of application No. PCT/KR2021/012757, filed on Sep. 17, 2021.

(30) Foreign Application Priority Data

Feb. 23, 2021 (KR) .................. 10-2021-0024028

(51) Int. Cl.
G10L 13/08 (2013.01)
G06N 3/045 (2023.01)
G10L 19/032 (2013.01)

(52) U.S. Cl.
CPC .............. *G10L 13/08* (2013.01); *G06N 3/045* (2023.01); *G10L 19/032* (2013.01)

(58) Field of Classification Search
CPC ....... G10L 13/08; G10L 19/032; G10L 13/02; G10L 19/0018; G10L 19/005; G06N 3/045; G06N 3/08
See application file for complete search history.

(56) References Cited

U.S. PATENT DOCUMENTS 5,673,362 A 9/1997 Matsumoto
6,810,379 B1 10/2004 Vermeulen et al.
(Continued)

FOREIGN PATENT DOCUMENTS

JP 5-233565 A 9/1993
JP 2011-48076 A 3/2011
(Continued)

OTHER PUBLICATIONS

Ding et al, A systemic review of the development of speech synthesis, 2023 the 8th internationl Conference on Computera nd Communication Systems, pp. 28-33 (Year: 2023).*
Bollepalli et al, Normal to Lombard adaptation of speech synthesis using long short term memory recurrent neural networks, Speech Communication, Apr. 18, 2019, pp. 64-75 (Year: 2019).*
Jean-Marc Valin et al., "A Real-Time Wideband Neural Vocoder at 1.6 kb/s Using LPCNet", Interspeech, Sep. 29, 2019, pp. 1-5 (6 pages total).
(Continued)

Primary Examiner — Linda Wong
(74) Attorney, Agent, or Firm — Sughrue Mion, PLLC

(57) ABSTRACT

The electronic device may include a communication interface; a memory configured to store a first neural network model; and a processor configured to: receive, from an external electronic device via the communication interface, compressed information related to an acoustic feature obtained based on a text; decompress the compressed information to obtain decompressed information; and obtain sound information corresponding to the text by inputting the decompressed information into the first neural network model. The first neural network model may be obtained by training a relationship between a plurality of sample acoustic features and a plurality of sample sounds corresponding to the plurality of sample acoustic features.

13 Claims, 13 Drawing Sheets

(56) References Cited

U.S. PATENT DOCUMENTS

| | | | |
|---|---|---|---|
| 6,985,856 B2 | 1/2006 | Wang et al. | |
| 9,286,885 B2 | 3/2016 | Sienel et al. | |
| 9,761,219 B2* | 9/2017 | Xu | G10L 13/08 |
| 10,176,809 B1* | 1/2019 | Piérard | G10L 15/18 |
| 10,573,293 B2 | 2/2020 | Bengio et al. | |
| 2004/0128128 A1 | 7/2004 | Wang et al. | |
| 2006/0004577 A1 | 1/2006 | Nukaga et al. | |
| 2020/0074985 A1 | 3/2020 | Clark et al. | |
| 2021/0151029 A1* | 5/2021 | Gururani | G10L 13/027 |

FOREIGN PATENT DOCUMENTS

| | | | |
|---|---|---|---|
| JP | 5524131 B2 | 6/2014 | |
| KR | 1020050091034 A | 9/2005 | |
| KR | 100850419 B1 | 8/2008 | |
| KR | 102044520 B1 | 11/2019 | |
| KR | 10-2020-0092501 A | 8/2020 | |
| WO | 2019222591 A1 | 11/2019 | |
| WO | 2020145472 A1 | 7/2020 | |
| WO | 2021002967 A1 | 1/2021 | |

OTHER PUBLICATIONS

Jan Skoglund et al., "Improving Opus Low Bit Rate Qualitiy with Neural Speech Synthesis", Interspeech, Oct. 25-29, 2020, pp. 2847-2851 (5 pages total).

International Search Report (PCT/ISA/210) and Written Opinion (PCT/ISA/237) dated Dec. 20, 2021 issued by the International Searching Authority in International Application No. PCT/KR2021/012757.

Kwang Myung Jeon et al., "HMM-Based Distributed Text-To-Speech Synthesis Incorporating Speaker-Adaptive Training," International Journal of Multimedia and Ubiquitous Engineering, 2014, pp. 107-120 (14 pages total).

Dario Rethage et al., "A Wavenet for Speech Denoising," IEEE, 2018, pp. 5069-5073 (5 pages total).

Communication dated Feb. 19, 2025 issued by the Korean Patent Office for Korean Patent Application No. 10-2021-0024028.

* cited by examiner

ELECTRONIC DEVICE AND CONTROL METHOD THEREOF

CROSS-REFERENCE TO RELATED APPLICATION(S)

This application is a by-pass continuation application of International Application No. PCT/KR2021/012757 filed on Sep. 17, 2021, which is based on and claims priority to Korean Patent Application No. 10-2021-0024028, filed on Feb. 23, 2021, in the Korean Intellectual Property Office, the disclosure of which is incorporated by reference herein in its entirety.

BACKGROUND

1. Field

The disclosure relates to an electronic device and a control method thereof, and more particularly relates to an electronic device which performs acoustic synthesis and a control method thereof.

The disclosure further relates to an artificial intelligence (AI) system which simulates functions of the human brain such as recognition or determination using a machine learning algorithm and an application thereof.

2. Description of Related Art

Along with development of electronic technologies, various types of devices are developed and distributed and, particularly, devices which perform acoustic synthesis are being generalized.

The acoustic synthesis is referred to as text-to-speech (TTS) as a technology of realizing human voice from a text, and a neural TTS technology using a neural network model has been developed in recent years.

Referring to FIG. 1A, a neural TTS may include a prosody neural network model and a neural vocoder neural network model. The prosody neural network model may receive an input of a text and output an acoustic feature, and the neural vocoder neural network model may receive an input of the acoustic feature and output a sound (waveform). The prosody neural network model may further include a language processing unit for performance enhancement, and the language processing unit may include modules of text normalization, Grapheme-to-Phoneme (G2P), and the like.

The neural TTS may be implemented by two methods. Referring to FIG. 1B, in the first method, a server stores both a prosody neural network model and a neural vocoder neural network model. In this case, the server may obtain a sound through the prosody neural network model and the neural vocoder neural network model, and encode and provide the obtained sound to the device, and the device may decode the received sound to obtain a sound.

Referring to FIG. 1C, in the second method, the device stores both the prosody neural network model and the neural vocoder neural network model. In this case, the server may generate a text to be synthesized and transmit the text to the device, or the device may generate the text to be synthesized. The device may obtain a sound from the text through the prosody neural network model and the neural vocoder neural network model.

The prosody neural network model may have voice characteristics of a speaker used in the training. In other words, the output of the prosody neural network model may refer to an acoustic feature having a voice characteristic of a specific speaker. The neural vocoder neural network model may generate a voice waveform corresponding to an applied acoustic feature. In other words, the neural vocoder neural network model may generate a voice waveform, regardless of the speaker characteristics. The prosody neural network model is speaker-dependent and the neural vocoder neural network model is speaker-independent.

Accordingly, when adding TTS of a new voice, the prosody neural network model may be added or updated. In addition, a pronunciation error may occur in the neural TTS because the prosody neural network model does not accurately predict the acoustic feature or an error of a language processing unit included in the prosody neural network model occurs. Accordingly, it is necessary to update the prosody neural network model. The neural vocoder neural network model has only a function of reconstructing the applied acoustic feature into a voice waveform, and accordingly, there is less necessity of the update.

According to the first method, it is advantageous that a low-specification device may be used and it is easy to update the prosody neural network model for correction of the pronunciation error, and the like. However, since the sound obtained from the server is encoded and decoded again, the sound quality may be deteriorated, and since the sound is encoded and transmitted in a predetermined time unit, a delay may occur.

According to the second method, it is advantageous that the sound is streamed without a delay and the sound quality is not deteriorated, because the encoding and decoding process is not performed. However, a low-specification device may not be used and it is difficult to update the prosody neural network model.

Thus, a method addressing the aforementioned problems is needed.

SUMMARY

Provided are an electronic device which provides a high-quality sound even with a low-specification electronic device, and a control method thereof.

According to an aspect of the disclosure, an electronic device may include a communication interface; a memory configured to store a first neural network model; and a processor configured to: receive, from an external electronic device via the communication interface, compressed information related to an acoustic feature obtained based on a text; decompress the compressed information to obtain decompressed information; and obtain sound information corresponding to the text by inputting the decompressed information into the first neural network model. The first neural network model may be obtained by training a relationship between a plurality of sample acoustic features and a plurality of sample sounds corresponding to the plurality of sample acoustic features.

The processor may sequentially receive compressed information related to a plurality of acoustic features corresponding to the text from the external electronic device via the communication interface; and based on a packet corresponding to a first acoustic feature of the plurality of acoustic features being damaged, obtain the sound information corresponding to the text by inputting a predetermined value to the first neural network model instead of the first acoustic feature. The first neural network model may be trained to output a sound based on at least one second acoustic feature adjacent to the predetermined value, based on the predetermined value being input.

The processor may sequentially receive the compressed information related to a plurality of acoustic features corresponding to the text from the external electronic device via the communication interface; and based on a first acoustic feature of the plurality of acoustic features being damaged, predict the first acoustic feature based on at least a second acoustic feature adjacent to the first acoustic feature.

The plurality of sample acoustic features may be acoustic features that are distorted by compressing and decompressing a plurality of original acoustic features.

The first neural network model may be trained to obtain the plurality of sample sounds corresponding to the plurality of sample acoustic features, based on the plurality of sample acoustic features and noise, and the noise may include at least one of Gaussian noise or uniform noise.

The compressed information may be obtained by quantizing the acoustic feature.

The compressed information may be obtained by compressing the acoustic feature that is obtained by inputting the text into a second neural network model, and the second neural network model may be obtained by training another relationship between a plurality of sample texts and a plurality of sample acoustic features corresponding to the plurality of sample texts.

Each sample acoustic feature of the plurality of sample acoustic features may be obtained from a signal from which a frequency component equal to or greater than a threshold value is removed from a sound corresponding to a user's voice.

According to an aspect of the disclosure, an electronic system may include a first electronic device configured to: obtain an acoustic feature based on a text by inputting the text into a prosody neural network model, obtain compressed information related to the acoustic feature, and transmit the compressed information; and the second electronic device configured to: receive the compressed information transmitted by the first electronic device, decompress the compressed information to obtain decompressed information, and obtain a sound corresponding to the text by inputting the decompressed information into a neural vocoder neural network model. The prosody neural network model may be obtained by training a first relationship between a plurality of sample texts and a plurality of sample acoustic features corresponding to the plurality of sample texts, and the neural vocoder neural network model may be obtained by training a second relationship between the plurality of sample acoustic features and sample sounds corresponding to the plurality of sample acoustic features.

The first electronic device may, based on a user's voice input being received, obtain the text from the user's voice input, and input the text into the prosody neural network model.

According to an aspect of the disclosure, a method for controlling an electronic device may include receiving, from an external electronic device, compressed information related to an acoustic feature obtained based on a text; decompressing the compressed information to obtain decompressed information; and obtaining sound information corresponding to the text by inputting the decompressed information into a first neural network model. The first neural network model may be obtained by training a relationship between a plurality of sample acoustic features and a plurality of sample sounds corresponding to the plurality of sample acoustic features.

The receiving the compressed information may include sequentially receiving the compressed information of a plurality of acoustic features corresponding to the text from the external electronic device. The obtaining the sound information may include, based on a packet corresponding to a first acoustic feature of the plurality of acoustic features being damaged, obtaining the sound information corresponding to the text by inputting a predetermined value into the first neural network model instead of the first acoustic feature, and the first neural network model may be trained to output a sound based on at least second acoustic feature adjacent to the predetermined value, based on the predetermined value being input.

The receiving the compressed information may include sequentially receiving the compressed information of a plurality of acoustic features corresponding to the text from the external electronic device, and the method may include based on a first acoustic feature of the plurality of acoustic features being damaged, predicting the first acoustic feature based on at least a second acoustic feature adjacent to the first acoustic feature.

The plurality of sample acoustic features may be acoustic features that are distorted by compressing and decompressing a plurality of original acoustic features.

The first neural network model may be trained to obtain the plurality of sample sounds corresponding to the plurality of sample acoustic features, based on the plurality of sample acoustic features and noise, and the noise may include at least one of Gaussian noise or uniform noise.

According to various embodiments of the disclosure, because the electronic device may obtain the sound by using the neural network model by receiving the compressed information related to the acoustic feature from the external electronic device, a sound with higher quality may be obtained, as compared to a case of obtaining the sound by compressing the sound using a codec and receiving and decompressing the compressed information related to the sound.

Because the external electronic device transmits the compressed information related to the acoustic feature to the electronic device, the delay and the amount of transmission during the transmission process may be reduced, as compared to a case of transmitting the compressed information related to the sound.

When the external electronic device is implemented as a server, it is easy to update the neural network model, because the neural network model for obtaining the acoustic feature from the text is stored in the external electronic device.

BRIEF DESCRIPTION OF THE DRAWINGS

The above and other aspects, features, and advantages of certain embodiments of the present disclosure will be more apparent from the following description taken in conjunction with the accompanying drawings, in which.

DETAILED DESCRIPTION

Hereinafter, the disclosure will be described in detail with reference to the accompanying drawings.

The terms used in embodiments of the disclosure have been selected as widely used general terms as possible in consideration of functions in the disclosure, but these may vary in accordance with the intention of those skilled in the art, the precedent, the emergence of new technologies, and the like. In addition, in a certain case, there may also be an arbitrarily selected term, in which case the meaning will be described in the description of the disclosure. Therefore, the terms used in the disclosure should be defined based on the meanings of the terms themselves and the contents throughout the disclosure, rather than the simple names of the terms.

In this disclosure, the terms such as "comprise," "may comprise," "include," "may include," "having," "may have," and the like, are used herein to designate a presence of corresponding features (e.g., constituent elements such as number, function, operation, or part), and not to preclude a presence of additional features.

It should be understood that the expression such as "at least one of A and/or B" expresses any one of "A," "B," or "A and B".

The expressions "first," "second", and the like, used in the disclosure may denote various elements, regardless of order and/or importance, and may be used to distinguish one element from another, and does not limit the elements.

Unless otherwise defined specifically, a singular expression may encompass a plural expression. It is to be understood that the terms such as "comprise" or "include" are to designate a presence of a characteristic, a number, a step, an operation, an element, a part, or a combination thereof, and do not preclude the addition of one or more of other characteristics, numbers, steps, operations, elements, parts, or a combination thereof.

In this disclosure, a term "user" may refer to a person using an electronic device or a device using an electronic device (e.g., an AI electronic device).

Hereinafter, various embodiments of the disclosure will be described in more detail with reference to the accompanying drawings.

Figure 1A:
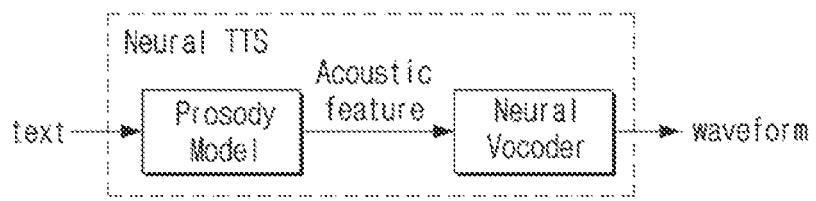
FIG. 1A is a diagram illustrating problems of the related art.
Figure 1B:
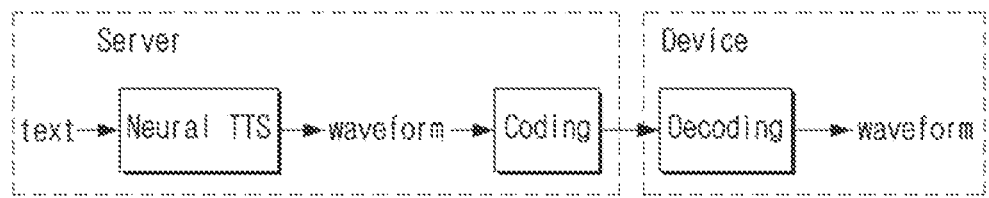
FIG. 1B is a diagram illustrating problems of the related art.
Figure 1C:
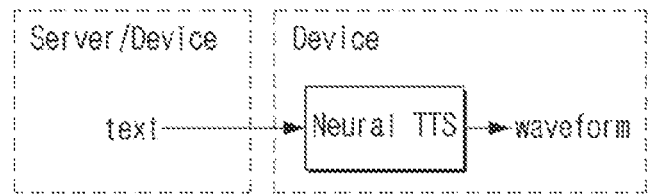
FIG. 1C is a diagram illustrating problems of the related art.
Figure 2:
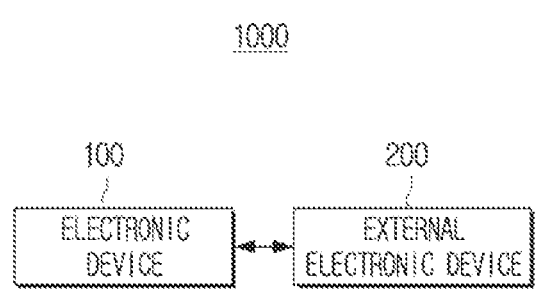
FIG. 2 is a diagram illustrating an electronic system according to an embodiment.

FIG. 2 is a diagram illustrating an electronic system 1000 according to an embodiment. Referring to FIG. 2, the electronic system 1000 may include an electronic device 100 and an external electronic device 200.

The electronic device 100 may be a device which obtains sound information from an acoustic feature and may be a smartphone, a tablet personal computer (PC), a wearable device, and the like. However, there is no limitation thereto, and the electronic device 100 may be any device, as long as it is a device capable of obtaining sound information from an acoustic feature.

The acoustic feature may refer to a static feature of a sound in a short section (e.g., a frame). The sound may be subjected to short-time analysis, and an acoustic feature for each section may be obtained. The frame may be set to 10 to 20 milliseconds (msec), and may be set to any other time sections. Examples of the acoustic feature may include one or more of a Spectrum, a Mel-spectrum, a cepstrum, a pitch lag, a pitch correlation, and the like.

For example, the acoustic feature may be set by 257-dimensional spectra, 80-dimensional mel-spectra, or cepstrum (20)+pitch lag (1)+pitch correlation (1). More specifically, for example, if the shift size of 10 msec and the 80-dimensional mel-spectra are used as the acoustic feature, then a [100, 80]-dimensional acoustic feature may be obtained from a sound at 1 second. Herein, [T, D] may refer to "T" frames, and "D" dimensional acoustic features.

The external electronic device 200 may be a device which obtains the acoustic feature from the text, and may be a device such as a server. However, there is no limitation thereto, and the external electronic device 200 may be a desktop PC, a smartphone, a tablet PC, a wearable device, or the like, and may be any device, as long as it is a device capable of obtaining the acoustic feature from the text.

The external electronic device 200 may compress the acoustic feature to obtain compressed information of the acoustic feature, and transmit the compressed information of the acoustic feature to the electronic device 100. Because the acoustic feature has a volume smaller than the sound, the delay due to the compression is reduced, and the amount of data to be transmitted to the electronic device 100 may be decreased. In addition, not only simply is the decoding performed on the electronic device 100, but an operation of obtaining a sound using a neural network model which will be described later is performed to enhance the sound quality.

Figure 3A:
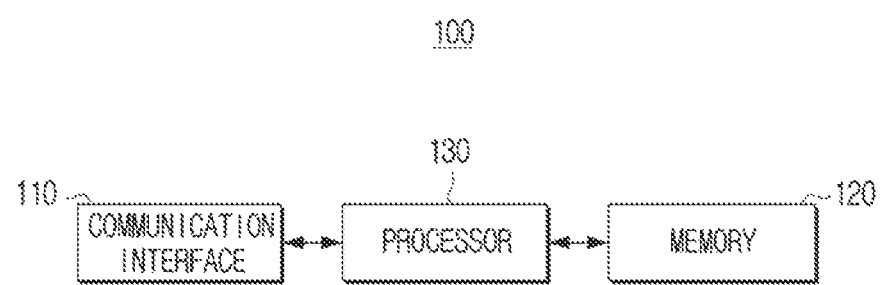
FIG. 3A is a block diagram illustrating a configuration of the electronic device according to an embodiment.

FIG. 3A is a block diagram illustrating a configuration of the electronic device 100 according to an embodiment. Referring to FIG. 3A, the electronic device 100 may include a communication interface 110, a memory 120, and a processor 130.

The communication interface 110 may be an element which communicates with various types of external devices according to various types of communication methods. For example, the electronic device 100 may communicate with the external electronic device 200 via the communication interface 110.

The communication interface 110 may include a Wi-Fi module, a Bluetooth module, an infrared communication module, a wireless communication module, or the like. Each communication module may be implemented as at least one hardware chip.

The Wi-Fi module and the Bluetooth module may communicate according to the Wi-Fi method and the Bluetooth method, respectively. When using the Wi-Fi module or the Bluetooth module, various pieces of connection information such as SSID or session key may be transmitted or received first to allow the communication connection by using these, and then various pieces of information may be transmitted and received. The infrared communication module may perform communication according to a technology of infrared communication (infrared Data Association (IrDA)) for transmitting data in near field wirelessly by using infrared rays between visible rays and millimeter waves.

The wireless communication module may include at least one communication chip for performing communication according to various wireless communication standard such as Zigbee, 3rd Generation (3G), 3rd Generation Partnership Project (3GPP), Long Term Evolution (LTE), LTE Advanced (LTE-A), 4th Generation (4G), 5th Generation (5G), and the like, in addition to the above communication methods.

In addition, the communication interface 110 may include a wired communication interface such as HDMI, DP, Thunderbolt, USB, RGB, D-SUB, DVI, or the like.

In addition, the communication interface 110 may include one or more wired communication modules for performing communication by using a local area network (LAN) module, an Ethernet module, pair cables, a coaxial cable, or an optical fiber cable.

The memory 120 may refer to hardware storing information such as data in an electric or magnetic manner so that the processor 130, and the like, are able to access the information. The memory 120 may be implemented as at least one hardware of a non-volatile memory, a volatile memory, a flash memory, a hard disk drive (HDD) or a solid state drive (SSD), a RAM, and a ROM.

The memory 120 may store at least one instruction or module for the operation of the electronic device 100 or the processor 130. Here, the instruction is a symbol unit for instructing the operation of the electronic device 100 or the processor 130 and may be written in a machine language that is a language the computer is able to understand. The module may be a series of instruction set for performing a specific job of a job unit.

The memory 120 may store data that is information in a bit or byte unit so as to represent letters, numbers, images, and the like. For example, the memory 120 may store a first neural network model. The first neural network model may be a neural vocoder neural network model and may be a model obtained by training a relationship between a plurality of sample acoustic features and a plurality of sample sounds corresponding to the plurality of sample acoustic features, respectively.

The memory 120 may be accessed by the processor 130 and reading, recording, editing, deleting, or updating of the instruction, the module, or the data may be executed by the processor 130.

The processor 130 may generally control the operations of the electronic device 100. Specifically, the processor 130 may be connected to each configuration of the electronic device 100 to generally control the operations of the electronic device 100. For example, the processor 130 may be connected to the components such as the communication interface 110, the memory 120, and the like, to control the operations of the electronic device 100.

According to an embodiment, the processor 130 may be implemented as a digital signal processor (DSP), a microprocessor, or a time controller (TCON). However, there is no limitation thereto, and the processor 130 may include one or more of a central processing unit (CPU), a microcontroller unit (MCU), a microprocessing unit (MPU), a controller, an application processor (AP), or a communication processor (CP), and an ARM™ processor or may be defined as the corresponding term. In addition, the processor 130 may be implemented as System on Chip (SoC) or large scale integration (LSI) including the processing algorithm or may be implemented in form of a field programmable gate array (FPGA).

When the compressed information of the acoustic feature obtained based on the text is received from the external electronic device 200 via the communication interface 110, the processor 130 may decompress the compressed information and input the decompressed information to the first neural network model to obtain sound information corresponding to the text.

The first neural network model may be a model obtained by training a relationship between the plurality of sample acoustic features and the plurality of sample sounds corresponding to the plurality of sample acoustic features, respectively. Each of the plurality of acoustic features may be obtained from the corresponding sample sound, and the first neural network model may be trained by using a pair of corresponding data.

In addition, the first neural network model may be a model obtained by training a relationship between a plurality of distorted sample acoustic features and a plurality of sample sounds corresponding to the plurality of distorted sample acoustic features, respectively. Specifically, the plurality of sample acoustic features may be acoustic features which are distorted by compressing a plurality of original acoustic features and decompressing the plurality of compressed original acoustic features. In other words, when training the first neural network model by using the data with compression distortion, the performance for reconstructing the sound may be further enhanced from the acoustic feature. The distortion may include at least one of quantization distortion, packet loss distortion, or low-pass filtering (LPF) distortion.

In addition, the first neural network model may be a model trained to obtain a plurality of sample sounds corresponding to the plurality of sample acoustic features, respectively, based on the plurality of sample acoustic features and noise. The noise herein may include at least one of Gaussian noise or uniform noise. In other words, by adding the noise during the training process of the first neural network model, a result with a strong resistance to the noise may be obtained during the process of obtaining actual sound.

The compressed information may be information obtained by compressing an acoustic feature obtained by inputting a text to a second neural network model. The second neural network model may be a model obtained by training a relationship between a plurality of sample texts and a plurality of sample acoustic features corresponding to the plurality of sample texts, respectively, as a prosody neural network model, and may be stored in the external electronic device 200. In other words, the external electronic device 200 may obtain the acoustic feature by inputting the text to the second neural network model, compress the obtained acoustic feature, and transmit the compressed acoustic feature to the electronic device 100. The second neural network model may train a relationship between one sample text and sample acoustic features obtained from a sample sound corresponding to the one sample text, and this process is performed on the plurality of sample texts to train the second neural network model.

Each of the plurality of sample acoustic features used for training the second neural network model may be obtained from a signal from which a frequency component equal to or greater than a threshold value is removed from the sound corresponding to the user's voice. This is because the recording characteristic at each frequency may vary for each device. Through such an operation, it is possible to prevent reflection of the difference for each device on the acoustic feature and obtain the acoustic feature to which only the acoustic characteristics of the user are reflected.

The processor 130 may sequentially receive the compressed information of each of the plurality of acoustic features corresponding to the text from the external electronic device 200 via the communication interface 110, and if a packet corresponding to one of the plurality of acoustic features is damaged, the processor 130 may input a predetermined value, instead of the one acoustic feature, to the first neural network model to obtain sound information corresponding to the text. The first neural network model may be a model trained to output a sound based on at least one acoustic feature adjacent to the predetermined value, when the predetermined value is input.

In other words, the processor 130 may not perform a re-request operation of the damaged packet by processing the damaged packet autonomously by the first neural network model, and solve a problem regarding occurrence of latency.

In addition, the processor 130 may sequentially receive the compressed information of each of the plurality of acoustic features corresponding to the text from the external electronic device 200 via the communication interface 110, and if one of the plurality of acoustic features is damaged, predict the damaged acoustic feature based on at least one acoustic feature adjacent to the damaged acoustic feature. For example, the processor 130 may interpolate the damaged acoustic feature based on two adjacent acoustic features and input the interpolated acoustic feature to the first neural network model.

The compressed information may be information obtained by quantization of the acoustic feature. In other words, the external electronic device 200 may quantize the acoustic feature and transmit the quantized acoustic feature to the electronic device 100. In this case, the processor 130 may dequantize the quantized acoustic feature and input the dequantized acoustic feature to the first neural network model to obtain sound information.

However, there is no limitation thereto, and the processor 130 may input the quantized acoustic feature to the first neural network model to obtain sound information. In this case, the first neural network model may be a model obtained by training a relationship between the plurality of quantized sample acoustic features and the plurality of sample sounds corresponding to the plurality of quantized sample acoustic features, respectively.

Figure 3B:
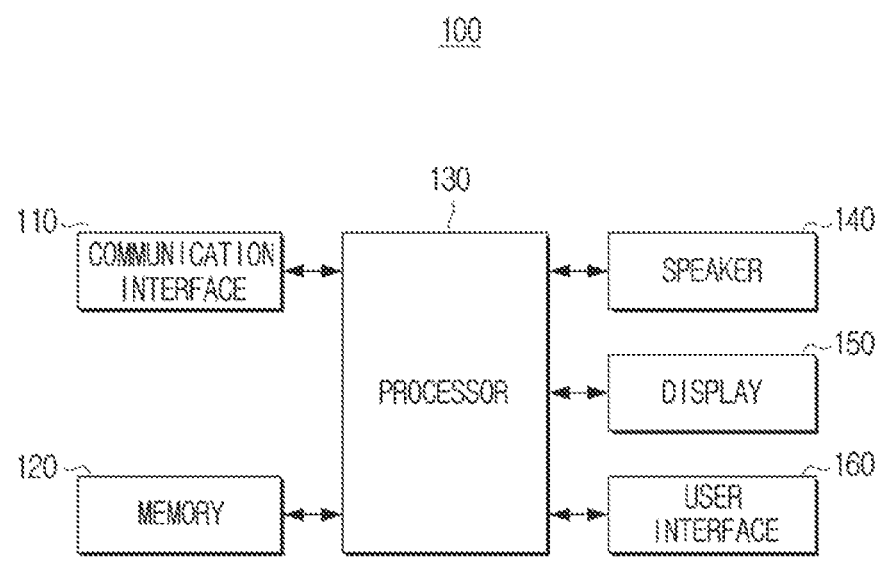
FIG. 3B is a block diagram illustrating a specific configuration of the electronic device according to an embodiment.

FIG. 3B is a block diagram illustrating a specific configuration of the electronic device 100 according to an embodiment. The electronic device 100 may include the communication interface 110, the memory 120, and the processor 130. In addition, referring to FIG. 3B, the electronic device 100 may further include at least one of a speaker 140, a display 150, or a user interface 160. The description of the constituent elements illustrated in FIG. 3B which are overlapped with the constituent elements illustrated in FIG. 3A will not be repeated.

The speaker 140 may be a constituent element which outputs the sound information obtained by the processor 130. The speaker 140 may output various alert sounds or voice messages.

The display 150 may be implemented as various types of displays such as a liquid crystal display (LCD), an organic light emitting diodes (OLED) display, a plasma display panel (PDP), and the like. The display 150 may also include a driving circuit or a backlight unit which may be implemented in a form of a-si TFT, a low temperature poly silicon (LTPS) TFT, or an organic TFT (OTFT). The display 150 may be implemented as a touch screen combined with a touch sensor, a flexible display, a 3D display, or the like.

In some cases, the processor 130 may obtain a text corresponding to the sound information and control the display 150 to display the text.

The user interface 160 may be implemented as a button, a touch pad, a mouse, a keyboard, or the like, and may also be implemented as a touch screen capable of performing both the display function and the manipulation input function. The button may be various types of buttons such as a mechanical button, a touch pad, or a wheel formed in any region of a front portion, a side portion, or a rear portion of the appearance of the main body of the electronic device 100.

The function related to the artificial intelligence according to the disclosure may be operated through the processor 130 and the memory 120.

The processor 130 may be formed of one or a plurality of processors. The one or the plurality of processors may be a general-purpose processor such as a CPU, an AP, or a digital signal processor (DSP), a graphic dedicated processor such as a GPU or a vision processing unit (VPU), or an artificial intelligence dedicated processor such as an NPU, or the like.

The one or the plurality of processors may perform control to process the input data according to a predefined action rule stored in the memory 120 or an artificial intelligence model. In addition, if the one or the plurality of processors are artificial intelligence dedicated processors, the artificial intelligence dedicated processor may be designed to have a hardware structure specialized in processing of a specific artificial intelligence model. The predefined action rule or the artificial intelligence model is formed through training.

Being formed through training herein may, for example, imply that a predefined action rule or an artificial intelligence model set to perform a desired feature (or object) is formed by training a basic artificial intelligence model using a plurality of pieces of learning data by a learning algorithm. Such training may be performed in a device demonstrating artificial intelligence according to the disclosure or performed by a separate server and/or system. Examples of the learning algorithm include supervised learning, unsupervised learning, semi-supervised learning, or reinforcement learning, but is not limited to these examples.

The artificial intelligence model may include a plurality of neural network layers. The plurality of neural network layers have a plurality of weight values, respectively, and execute neural network processing through a processing result of a previous layer and processing between the plurality of weights. The plurality of weights of the plurality of neural network layers may be optimized by the training result of the artificial intelligence model. For example, the plurality of weights may be updated to reduce or to minimize a loss value or a cost value obtained by the artificial intelligence model during the training process.

The artificial neural network may include deep neural network (DNN), and, for example, include a convolutional neural network (CNN), deep neural network (DNN), recurrent neural network (RNN), restricted Boltzmann machine (RBM), deep belief network (DBN), bidirectional recurrent deep neural network (BRDNN), generative adversarial network (GAN), or deep Q-network, but there is no limitation to these examples.

As described above, the electronic device 100 may receive the compressed information of the acoustic feature from the external electronic device 200 and obtain the sound by using the neural network model, and accordingly, the high-quality sound may be obtained, as compared to a case of receiving the compressed information of the sound and decompressing the information to obtain the sound.

Hereinafter, the operation of the electronic device 100 will be described in more detail with reference to FIGS. 4 to 7. The individual embodiments will be described for convenience of description with reference to FIGS. 4 to 7. The individual embodiments of FIGS. 4 to 7 may be performed in a combined state.

Figure 4:
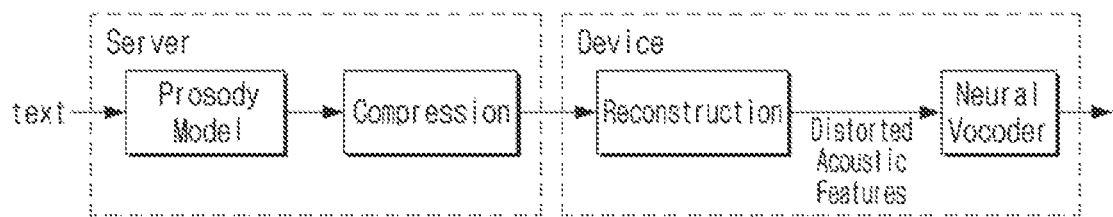
FIG. 4 is a diagram illustrating operations of the electronic device and an external electronic device according to an embodiment.

FIG. 4 is a diagram illustrating operations of the electronic device 100 and the external electronic device 200 according to an embodiment. In FIG. 4, the electronic device 100 is illustrated as a device and the external electronic device 200 is illustrated as a server for convenience of description.

The server may store a prosody neural network model obtained by training a relationship between a plurality of sample texts and a plurality of sample acoustic features corresponding to the plurality of sample texts, respectively, receive a text, input the text to the prosody neural network model to obtain the acoustic feature based on the text, obtain the compressed information of the acoustic feature, and transmit the obtained acoustic feature to the device. Based on the user's voice input being received, the server may obtain text corresponding to the user's voice input from the user's voice input and input the text to the prosody neural network model.

The device may store a neural vocoder neural network model obtained by training a relationship between the plurality of sample acoustic features and the sample sounds corresponding to the plurality of sample acoustic features, respectively. Based on the compressed information being received from the server, the device may decompress the compressed information, input the decompressed information to the neural vocoder neural network model to obtain the sound corresponding to the text.

Regarding the device of the related art, when obtaining the sound after the decompression by using a codec, the sound quality may be deteriorated due to distortion during the compression and decompression process, but the device of the disclosure additionally uses the neural vocoder neural network model after the decompression, thereby enhancing the sound quality as compared to that of the related art. Particularly, the neural vocoder neural network model may have the characteristic of strong resistance to the distortion with excellent generalization performance, as compared to the signal processing model such as a codec. In addition, the learning data used during the training process may be used as the distorted data subjected to the compression and decompression process, to further enhance the generalization performance for the distortion.

Further, regarding the server of the related art, the delay occurs when performing the encoding after obtaining the sound, but in the server of the disclosure, the delay does not (or almost does not) occur, because only the acoustic feature having a volume smaller than the sound is compressed. Particularly, the acoustic feature output from the prosody neural network model is in the frame unit, and accordingly, the delay does not occur during the compression and the transmission of the acoustic feature which is advantageous for streaming.

In addition, in the related art, regarding the server, information loss is great, since the encoding is performed after obtaining the sound. The server of the disclosure performs the compression after obtaining the acoustic feature, and accordingly, the information loss is less than that of the method of the related art.

The device of the disclosure may use only the neural vocoder neural network model, and accordingly, the device may be implemented with low specification, as compared to a case of using both the prosody neural network model and the neural vocoder neural network model.

In addition, in the neural TTS, a pronunciation error may occur, and it may be necessary to update the prosody neural network model in order to solve this problem. It is difficult to update the device, since the device is normally owned by the user, but it is relatively easier to update the server, and the performance is easily enhanced by the update of the prosody neural network model.

In FIG. 4, the server and the device are described, but it may be understood as the operations between the two devices. For example, the server may be a first electronic device and the device may be a second electronic device. When a messenger application is used between the first electronic device and the second electronic device, although a first user of the first electronic device inputs text, a second user of the second electronic device may hear a sound corresponding to the text. If the prosody neural network model stored in the first electronic device is a model which is usually trained with the sound of the first user, an acoustic feature transmitted to the first electronic device may include a sound characteristic of the first user. In other words, although the first user inputs only text, the second user may perceive the text as the sound of the first user.

The sound characteristic of the first user may have the sound of the first user. In other words, it may be used in a personalized TTS service. The prosody neural network model stored in the first electronic device that is owned by the first user, and thus may be set to operate only in the first electronic device. The neural vocoder neural network model of the second electronic device may reconstruct the transmitted acoustic feature to a voice and reproduce the personalized TTS voice having the voice of the first user from the second electronic device.

Figure 5A:
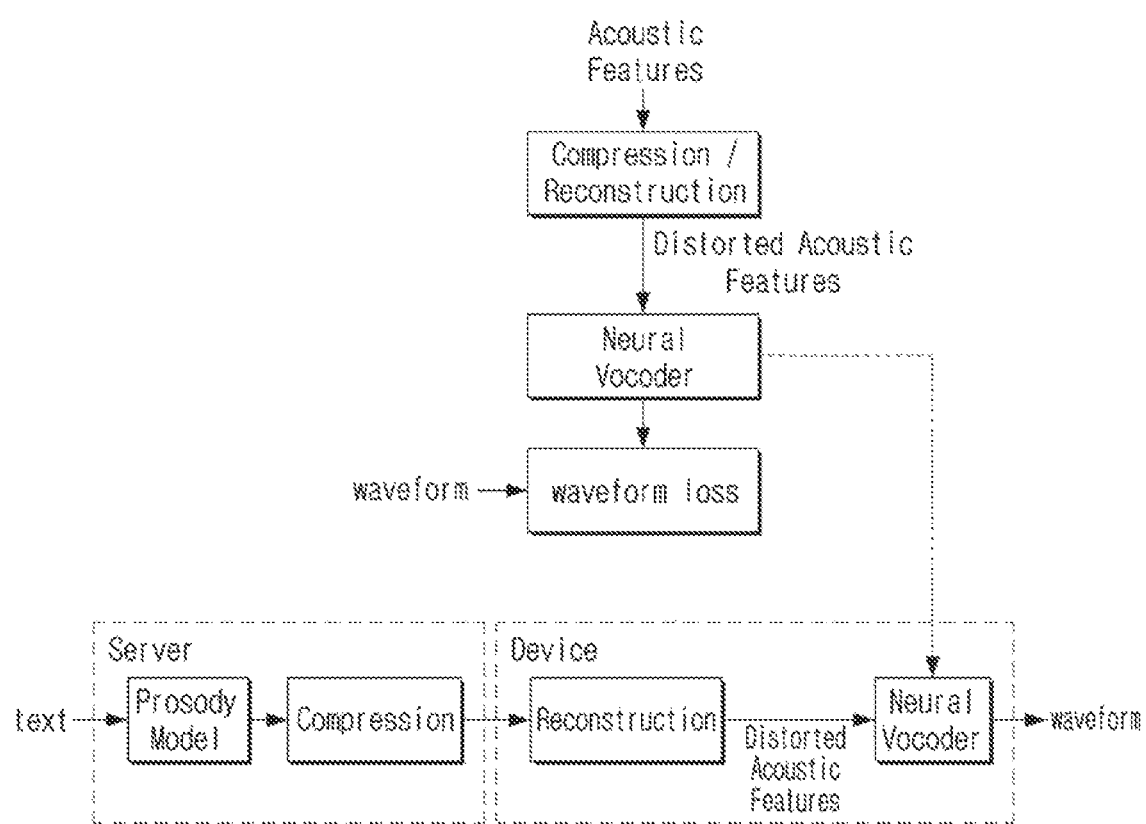
FIG. 5A is a diagram illustrating a method for training a first neural network model according to various embodiments.
Figure 5B:
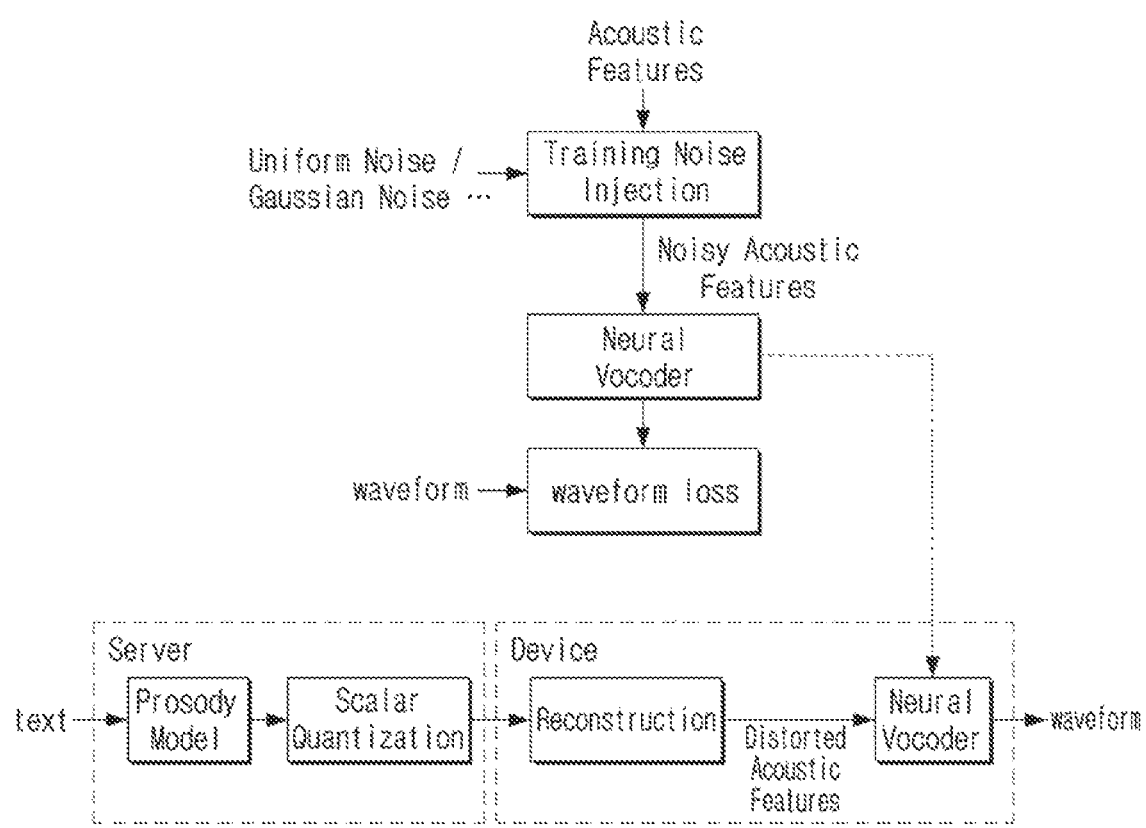
FIG. 5B is a diagram illustrating the method for training the first neural network model according to various embodiments.
Figure 5C:
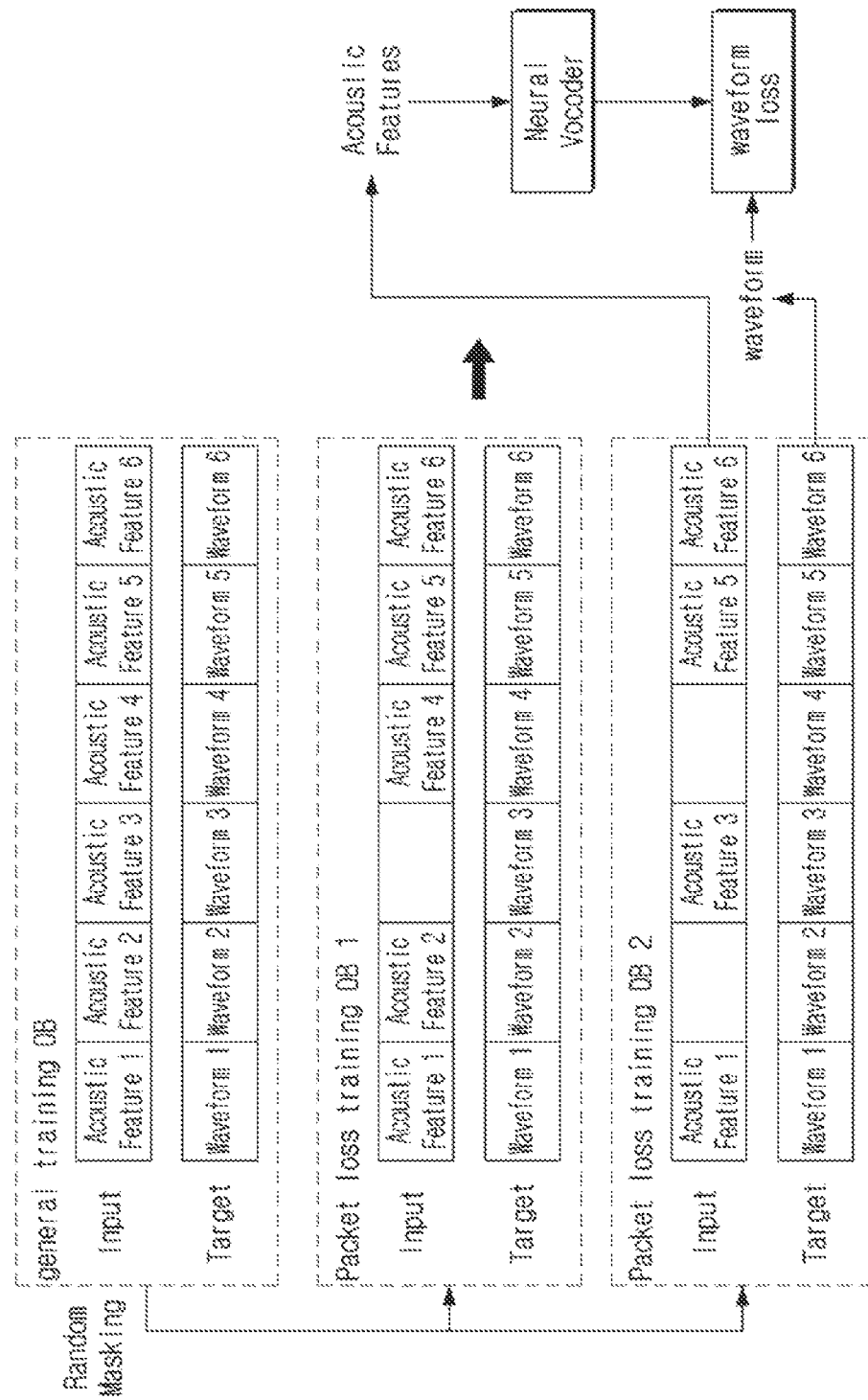
FIG. 5C is a diagram illustrating the method for training the first neural network model according to various embodiments.

FIGS. 5A to 5C are diagrams illustrating a method for training the first neural network model according to various embodiments.

The first neural network model may be a model obtained by training a relationship between a plurality of sample acoustic features and a plurality of sample sounds corresponding to the plurality of sample acoustic features, respectively. Referring to FIG. 5A, the plurality of sample acoustic features may be acoustic features distorted by compressing a plurality of original acoustic features and decompressing the plurality of compressed original acoustic features. In other words, the first neural network model having strong resistance to the distortion in the compression process may be obtained through the training to which even the distortion generated during the compression process is reflected. In other words, the first neural network model trained as described above may output a sound with enhanced quality than as compared to the related art.

Referring to FIG. 5B, the first neural network model may be a model trained to obtain the plurality of sample sounds corresponding to the plurality of sample acoustic features, respectively, based on the plurality of sample acoustic features and noise. In other words, the first neural network model having strong resistance to noise may be obtained by performing the training by adding arbitrary noise. For example, when the compressed acoustic feature is reconstructed through the quantization method, the reconstructed acoustic feature may include quantization noise. Accordingly, the first neural network model trained by adding the quantization noise as noise as described above may output the sound with the further improved acoustic feature including the quantization noise.

The noise herein may include at least one of Gaussian noise or uniform noise. However, there is no limitation thereto, and the noise may include various types of noise.

Referring to FIG. 5C, the first neural network model may be a model obtained by training a plurality of sample sounds corresponding to some damaged data of the plurality of sample acoustic features due to the packet loss. In this case, although the packet loss occurs, the sound may be output through the first neural network model and the latency due to the packet re-transmission operation does not occur.

In order to reproduce the packet loss during the training process, the acoustic feature of the training database (DB) may be used in the training after removing random packets. For example, in FIG. 5C, a packet loss training DB 1 shows that Acoustic Feature 3 is lost, and a packet loss training DB 2 shows that Acoustic Feature 2 and Acoustic Feature 4 are lost. The first neural network model may be trained by using a predetermined value for the lost acoustic features. In addition, the damaged acoustic feature may be interpolated using an adjacent acoustic feature and then the first neural network model may be trained. In this way, the first neural network model may be trained to reconstruct a voice of a lost section from the adjacent voice feature information. In the prediction step, the acoustic feature may be input by replacing with the lost acoustic feature by the same method as the method used in the training.

In FIGS. 5A to 5C, it is illustrated that the training is individually performed, but there is no limitation thereto. For example, the first neural network model may learn at least two methods at the same time among the methods of FIGS. 5A to 5C.

In addition, FIGS. 5A to 5C are diagrams illustrating a method for training the first neural network model having strong resistance to the noise or difference generated when reconstructing the quantized acoustic features. However, there is no limitation thereto, the received data may be input to the first neural network model without the reconstruction of the acoustic feature, and in this case, the first neural network model may be trained to reconstruct the noise or difference due to the quantization. This will be described in detail with reference to FIG. 6.

Figure 6:
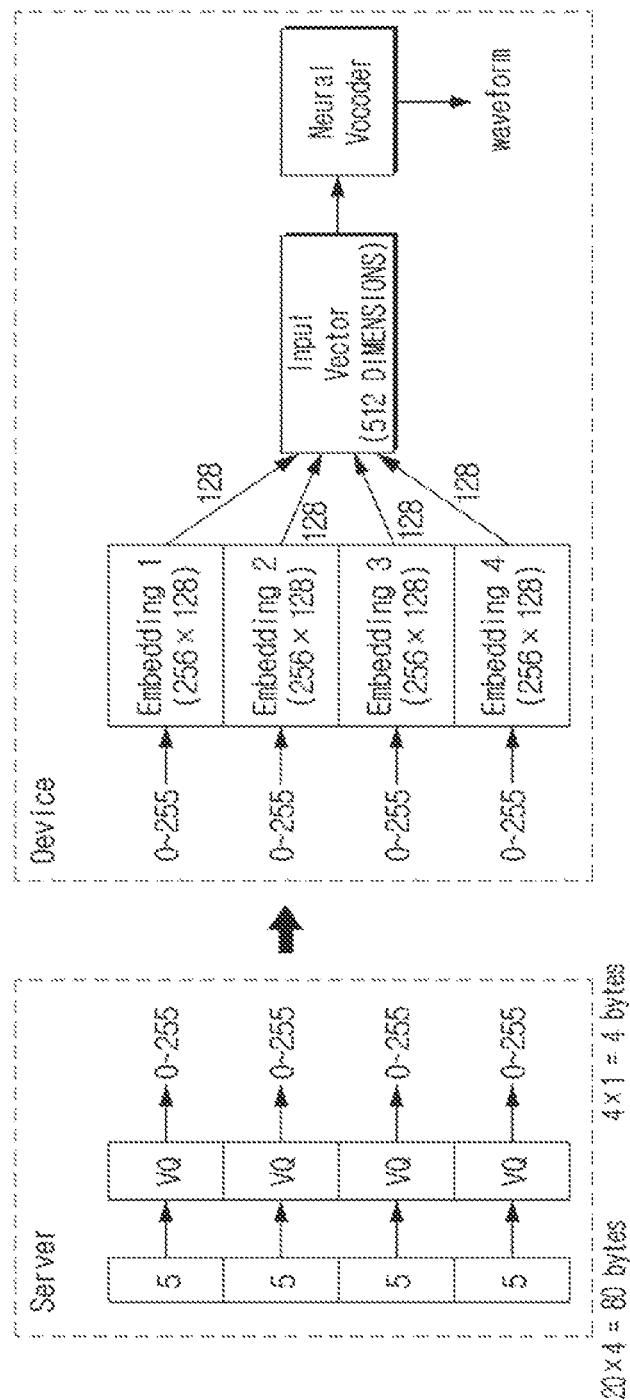
FIG. 6 is a diagram illustrating a quantization operation according to an embodiment.

FIG. 6 is a diagram illustrating a quantization operation according to an embodiment. In FIG. 6, the electronic device 100 is illustrated as a device and the external electronic device 200 is illustrated as a server, for convenience of description.

The server may quantize the acoustic feature and obtain compressed information. For example, referring to FIG. 6, the server may perform vector quantization of 20-dimensional acoustic features by 5 dimensions. When performing the vector quantization to 256 code words for each vector, 20×4=80 bytes of data may be reduced into 4×1=4 bytes of data.

Hereinabove, 5-dimensional vector quantization is used as an example for the convenience of description, but there is no limitation thereto, and various dimensional vector quantization may be used and a scalar quantization method for quantizing for each dimension may be used.

The device may input the quantized acoustic feature to the first neural network model to obtain sound information. In this case, the first neural network model may be a model obtained by training a plurality of quantized sample acoustic features and a plurality of sample sounds corresponding to the plurality of quantized sample acoustic features, respectively, and the device may obtain the sound without the decompression operation through the above training. Accordingly, the time required to obtain the sound may be reduced.

When the quantized acoustic feature is input to the first neural network model, the value thereof may be expressed discretely. An embedding layer may express a discrete value as a continuous vector and the first neural network model may be trained through this operation. In FIG. 6, an input vector is configured by concatenating outputs of the embedding layers, but the input vector may be configured with operations such as addition, multiplication, or passing through other neural network layers.

Figure 7:
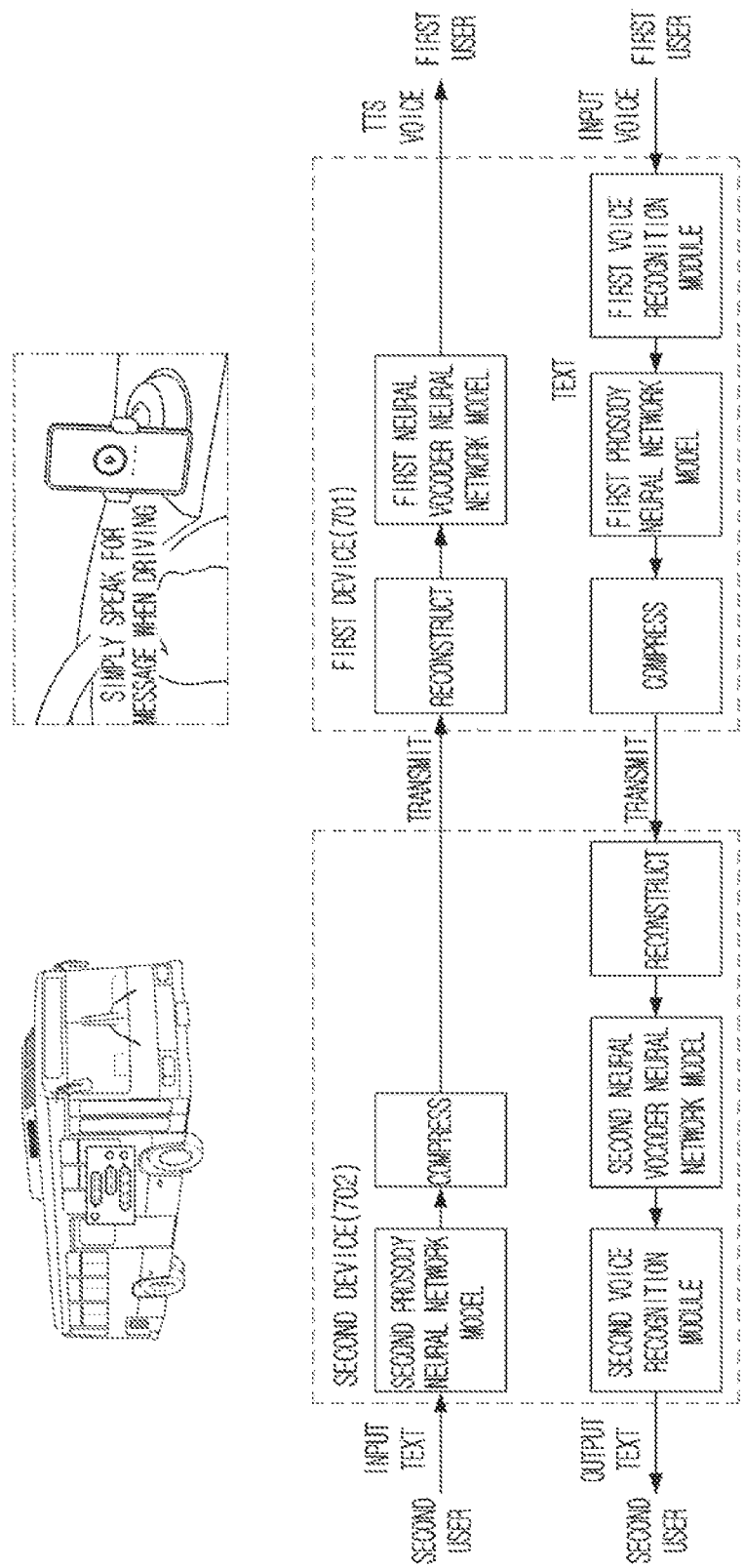
FIG. 7 is a diagram illustrating an implementation example according to an embodiment.

FIG. 7 is a diagram illustrating an implementation example according to an embodiment.

A first user of a first device 701 is in a car and a second user of a second device 702 is in a bus. The second user is using the public transport and thus may communicate with the first user by using messages rather than telephone conversion.

First, the second user may input a message to the second device 702. The second device 702 may input a text corresponding to the input message to a second prosody neural network model to obtain a plurality of acoustic features and transmit the plurality of acoustic features to the first device 701. The second prosody neural network model may be a model obtained by training the text corresponding to the acoustic feature of the sound of the second user, and the plurality of acoustic features obtained through the second prosody neural network model may include voice characteristics of the second user.

The first device 701 may input the plurality of acoustic features to a first neural vocoder neural network model to obtain sound information corresponding to the message input by the second user, and output the obtained sound information via the speaker 140. The first neural vocoder neural network model may be configured so as to obtain a plurality of various unspecified voices, since it may be necessary to obtain a sound including the acoustic feature of the second user with the plurality of voice features including the acoustic feature of the second user. The first neural vocoder neural network model for obtaining various voices may be trained by using voices of various speakers.

In FIG. 7, the compression and decompression operation is omitted for convenience of description, and there is no limitation thereto. For example, the second device 702 may compress a plurality of acoustic features to obtain compressed information, transmit the compressed information to the first device 701, and the first device 701 may decompress the compressed information and obtain sound information from the decompressed information.

If the first device 701 is in a predetermined mode, the first device 701 may convert a user's voice into a text through a first voice recognition module and transmit a plurality of acoustic features obtained through the first prosody neural network model to the second device 702. In this case, when the plurality of acoustic features of the first user are received from the first device 701, the second device 702 may obtain the sound including the acoustic features of the first user through the second neural vocoder neural network model, obtain the text from the sound information through the voice recognition, and display the text via the display. In addition, the text which is a result of the voice recognition module of the first device 701 may be received and displayed. Through the above operation, the second user may communicate with the first user without causing inconvenience to others while using the public transport.

Figure 8:
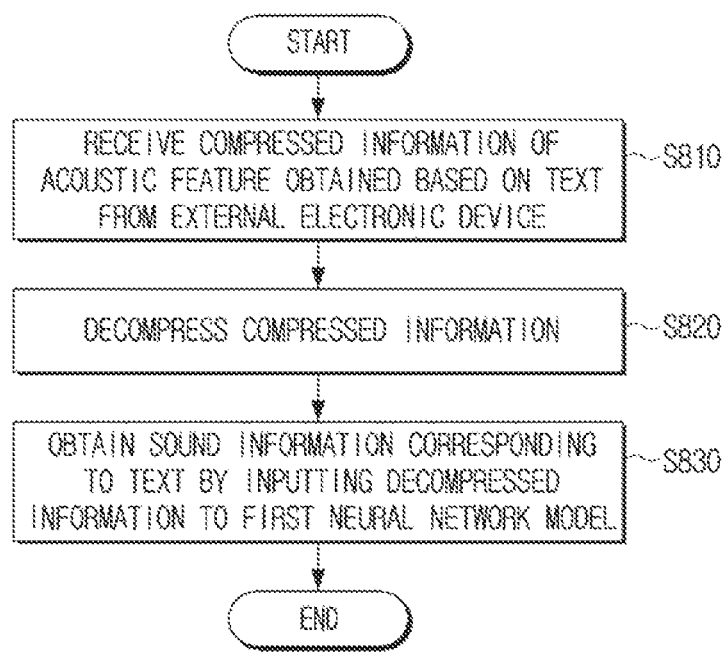
FIG. 8 is a flowchart illustrating a method for controlling the electronic device according to an embodiment.

FIG. 8 is a flowchart illustrating a method for controlling the electronic device according to an embodiment.

First, compressed information of an acoustic feature obtained based on a text may be received from the external electronic device (operation S810). The compressed information may be decompressed (operation S820). The decompressed information may be input to the first neural network model to obtain sound information corresponding to the text (operation S830). The first neural network model may be a model obtained by training a relationship between a plurality of sample acoustic features and a plurality of sample sounds corresponding to the plurality of sample acoustic features, respectively.

The receiving (operation S810) may include sequentially receiving the compressed information of each of the plurality of acoustic features corresponding to the text from the external electronic device, and the obtaining the sound information (operation S830) may include, based on a packet corresponding to one of the plurality of acoustic features being damaged, inputting a predetermined value to the first neural network model instead of the one acoustic feature to obtain sound information corresponding to the text. The first neural network model may be a model trained to output a sound based on at least one acoustic feature adjacent to the predetermined value, when the predetermined value is input.

In addition, the receiving (operation S810) may include sequentially receiving compressed information of each of the plurality of acoustic features corresponding to the text from the external electronic device, and the control method may further include, based on one of the plurality of acoustic features being damaged, predicting a damaged acoustic feature based on at least one acoustic feature adjacent to the damaged acoustic feature.

The plurality of sample acoustic features may be acoustic features distorted by compressing a plurality of original sample acoustic features and decompressing the plurality of compressed original acoustic features.

The first neural network model may be a model trained to obtain the plurality of sample sounds corresponding to the plurality of sample acoustic features, respectively, based on the plurality of sample acoustic features and noise, and the noise may include at least one of Gaussian noise or uniform noise.

The compressed information may be information obtained by quantizing the acoustic features.

The compressed information may be information obtained by compressing the acoustic feature obtained by inputting the text to the second neural network model, and the second neural network model may be a model obtained by training a relationship between a plurality of sample texts and a plurality of sample acoustic features corresponding to the plurality of sample texts, respectively.

Each of the plurality of sample acoustic features may be obtained from a signal from which a frequency component equal to or higher than a threshold value is removed from a sound corresponding to a user's voice.

According to various embodiments of the disclosure, since the electronic device may obtain the sound by using the neural network model by receiving the compressed information of the acoustic feature from the external electronic device, a sound with higher quality may be obtained, as compared to a case of obtaining the sound by compressing the sound using a codec and receiving and decompressing the compressed information of the sound.

Because the external electronic device transmits the compressed information of the acoustic feature to the electronic device, the delay and the amount of transmission during the transmission process may be reduced, as compared to a case of transmitting the compressed information of the sound.

When the external electronic device is implemented as a server, it is easy to update the neural network model, since the neural network model for obtaining the acoustic feature from the text is stored in the external electronic device.

According to an embodiment of the disclosure, various embodiments of the disclosure may be implemented as software including instructions stored in machine (e.g., computer)-readable storage media. The machine is a device which invokes instructions stored in the storage medium and is operated according to the invoked instructions, and may include an electronic device (e.g., electronic device A) according to the disclosed embodiments. In a case where the instruction is executed by a processor, the processor may perform a function corresponding to the instruction directly or using other elements under the control of the processor. The instruction may include a code made by a compiler or a code executable by an interpreter. The machine-readable storage medium may be provided in a form of a non-transitory storage medium. Here, the "non-transitory" storage medium is tangible and may not include signals, and it does not distinguish that data is semi-permanently or temporarily stored in the storage medium.

According to an embodiment, the methods according to various embodiments disclosed in this disclosure may be provided in a computer program product. The computer program product may be exchanged between a seller and a purchaser as a commercially available product. The computer program product may be distributed in the form of a machine-readable storage medium (e.g., compact disc read only memory (CD-ROM)) or distributed online through an application store (e.g., PlayStore™). In a case of the on-line distribution, at least a part of the computer program product may be at least temporarily stored or temporarily generated in a storage medium such as a memory of a server of a manufacturer, a server of an application store, or a relay server.

The embodiments described above may be implemented in a recording medium readable by a computer or a similar device using software, hardware, or a combination thereof. In some cases, the embodiments described in this specification may be implemented as a processor itself. According to the implementation in terms of software, the embodiments such as procedures and functions described in this specification may be implemented as separate software modules. Each of the software modules may perform one or more functions and operations described in this specification.

Computer instructions for executing processing operations of the machine according to the embodiments of the disclosure descried above may be stored in a non-transitory computer-readable medium. When the computer instructions stored in such a non-transitory computer-readable medium are executed by the processor of the specific machine, the computer instructions may enable the specific machine to execute the processing operations on the machine according to the embodiments described above. The non-transitory computer-readable medium is not a medium storing data for a short period of time such as a register, a cache, or a memory, but may refer to a medium that semi-permanently stores data and is readable by a machine. Specific examples of the non-transitory computer-readable medium may include a CD, a DVD, a hard disk drive, a Blu-ray disc, a USB, a memory card, and a ROM.

Each of the elements (e.g., a module or a program) according to various embodiments described above may include a single entity or a plurality of entities, and some sub-elements of the abovementioned sub-elements may be omitted or other sub-elements may be further included in various embodiments. Alternatively or additionally, some elements (e.g., modules or programs) may be integrated into one entity to perform the same or similar functions performed by each respective element prior to the integration. Operations performed by a module, a program, or other elements, in accordance with various embodiments, may be performed sequentially, in a parallel, repetitive, or heuristically manner, or at least some operations may be performed in a different order, omitted, or may add a different operation.

While embodiments of the disclosure have been shown and described, the disclosure is not limited to the aforementioned specific embodiments, and it is apparent that various modifications can be made by those having ordinary skill in the technical field to which the disclosure belongs, without departing from the gist of the disclosure as claimed by the appended claims. Also, it is intended that such modifications are not to be interpreted independently from the technical idea or prospect of the disclosure.

What is claimed is:

1. An electronic device comprising:
    a communication interface;
    a memory configured to store a first neural network model; and
    a processor connected to the communication interface and the memory,
    wherein the processor is configured to:
        receive, from an external electronic device via the communication interface, compressed information related to an acoustic feature obtained based on a text;
        decompress the compressed information to obtain decompressed information; and
        obtain sound information corresponding to the text by inputting the decompressed information into the first neural network model,
    wherein the first neural network model is obtained by training a relationship between a first plurality of sample acoustic features and a first plurality of sample sounds corresponding to the first plurality of sample acoustic features, and
    wherein the first neural network model is trained to obtain the first plurality of sample sounds based on the first plurality of sample acoustic features and noise; and
    wherein the first plurality of sample acoustic features are acoustic features that are distorted by compressing and decompressing a plurality of original acoustic features.

2. The electronic device according to claim 1, wherein the compressed information relates to a plurality of acoustic features based on the text,
    wherein the processor is further configured to:
        sequentially receive the compressed information from the external electronic device via the communication interface; and
        based on a packet corresponding to a first acoustic feature of the plurality of acoustic features being damaged, obtain the sound information corresponding to the text by inputting a predetermined value to the first neural network model instead of the first acoustic feature, and
    wherein the first neural network model is trained to output a sound based on at least one second acoustic feature adjacent to the predetermined value.

3. The electronic device according to claim 1, wherein the compressed information relates to a plurality of acoustic features based on the text, and
    wherein the processor is further configured to:
        sequentially receive the compressed information from the external electronic device via the communication interface; and
        based on a first acoustic feature of the plurality of acoustic features being damaged, predict the first acoustic feature based on at least a second acoustic feature adjacent to the first acoustic feature.

4. The electronic device according to claim 1, wherein the noise comprises at least one of Gaussian noise or uniform noise.

5. The electronic device according to claim 1, wherein the compressed information is obtained by quantizing the acoustic feature.

6. The electronic device according to claim 1, wherein the compressed information is obtained by compressing the acoustic feature that is obtained by inputting the text into a second neural network model, and
    wherein the second neural network model is obtained by training another relationship between a second plurality of sample texts and a second plurality of sample acoustic features corresponding to the second plurality of sample texts.

7. The electronic device according to claim 6, wherein each second sample acoustic feature of the second plurality of sample acoustic features is obtained from a signal from which a frequency component equal to or greater than a threshold value is removed from a sound corresponding to a user voice.

8. An electronic system comprising:
    a first electronic device configured to:
        obtain an acoustic feature based on a text by inputting the text into a prosody neural network model,
        obtain compressed information related to the acoustic feature, and
        transmit the compressed information; and
    a second electronic device configured to:
        receive the compressed information transmitted by the first electronic device, decompress the compressed information to obtain decompressed information, and
        obtain a sound corresponding to the text by inputting the decompressed information into a neural vocoder neural network model,
    wherein the prosody neural network model is obtained by training a first relationship between a first plurality of sample texts and a first plurality of sample acoustic features corresponding to the first plurality of sample texts,
    wherein the neural vocoder neural network model is obtained by training a relationship between a second plurality of sample acoustic features and a second plurality of sample sounds corresponding to the second plurality of sample acoustic features, and
    wherein the neural vocoder neural network model is trained to obtain the second plurality of sample sounds based on the second plurality of sample acoustic features and noise, and
    wherein the first plurality of sample acoustic features are acoustic features that are distorted by compressing and decompressing a plurality of original acoustic features.

9. The electronic system according to claim 8, wherein the first electronic device is further configured to, based on a user voice input being received, obtain the text from the user voice input, and input the text into the prosody neural network model.

10. A method for controlling an electronic device, the method comprising:
receiving, from an external electronic device, compressed information related to an acoustic feature obtained based on a text;
decompressing the compressed information to obtain decompressed information; and
obtaining sound information corresponding to the text by inputting the decompressed information into a first neural network model,
wherein the first neural network model is obtained by training a relationship between a first plurality of sample acoustic features and a first plurality of sample sounds corresponding to the first plurality of sample acoustic features, and
wherein the first neural network model is trained to obtain the first plurality of sample sounds based on the first plurality of sample acoustic features and noise; and
wherein the first plurality of sample acoustic features are acoustic features that are distorted by compressing and decompressing a plurality of original acoustic features.

11. The method according to claim 10, wherein the compressed information relates to a plurality of acoustic features based on the text,
wherein the receiving the compressed information comprises sequentially receiving the compressed information from the external electronic device,
wherein the obtaining the sound information comprises, based on a packet corresponding to a first acoustic feature of the plurality of acoustic features being damaged, obtaining the sound information corresponding to the text by inputting a predetermined value into the first neural network model instead of the first acoustic feature, and
wherein the first neural network model is trained to output a sound based on at least second acoustic feature adjacent to the predetermined value.

12. The method according to claim 10, wherein the compressed information relates to a plurality of acoustic features based on the text,
wherein the receiving the compressed information comprises sequentially receiving the compressed information from the external electronic device, and
wherein the method further comprises based on a first acoustic feature of the plurality of acoustic features being damaged, predicting the first acoustic feature based on at least a second acoustic feature adjacent to the first acoustic feature.

13. The method according to claim 10, wherein the noise comprises at least one of Gaussian noise or uniform noise.

* * * * *